(12) United States Patent
Oya et al.

(10) Patent No.: US 9,766,134 B2
(45) Date of Patent: Sep. 19, 2017

(54) TEMPERATURE SENSITIVE ELEMENT AND TEMPERATURE SENSOR

(71) Applicant: NGK SPARK PLUG CO., LTD., Nagoya-shi, Aichi-ken (JP)

(72) Inventors: Seiji Oya, Niwa-gun (JP); Toshiya Oya, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 376 days.

(21) Appl. No.: 14/640,637

(22) Filed: Mar. 6, 2015

(65) Prior Publication Data

US 2015/0253203 A1 Sep. 10, 2015

(30) Foreign Application Priority Data

Mar. 7, 2014 (JP) .................................. 2014-045181
Jan. 27, 2015 (JP) .................................. 2015-013343

(51) Int. Cl.
*G01K 1/12* (2006.01)
*G01K 7/18* (2006.01)

(52) U.S. Cl.
CPC ................. *G01K 7/18* (2013.01); *G01K 1/12* (2013.01); *G01K 2205/04* (2013.01)

(58) Field of Classification Search
CPC ......... G01K 1/12; G01K 7/18; G01K 2205/04
See application file for complete search history.

(56) References Cited

U.S. PATENT DOCUMENTS

| 5,831,512 | A | * | 11/1998 | Wienand | ................ | G01K 7/183 338/22 R |
| 6,997,607 | B2 | * | 2/2006 | Iwaya | ....................... | G01K 1/10 338/28 |
| 7,339,455 | B2 | * | 3/2008 | Fujita | ....................... | G01K 7/18 338/25 |
| 7,780,348 | B2 | * | 8/2010 | Houben | ................... | G01K 1/08 338/229 |

(Continued)

FOREIGN PATENT DOCUMENTS

| DE | WO 2010/118813 A1 * | 10/2010 | ............... G01K 7/18 |
| JP | 2006-234632 A | 9/2006 | |

OTHER PUBLICATIONS

Computer translation of WO 2010/11813, May 2017.*
Computer translation of JP 2006-234632, May 2017.*

*Primary Examiner* — Randy Gibson
(74) *Attorney, Agent, or Firm* — Stites & Harbison, PLLC; Jeffrey A. Haeberlin

(57) ABSTRACT

In a temperature sensitive element, a covering member containing a glass as a main component and having a thermal expansion coefficient smaller than that of output lines is provided on pads to cover at least portions of output lines located on the pads. The pads are formed of a glass-based material which contains, as main components, a metal and a glass having a thermal expansion coefficient smaller than that of a ceramic substrate, and the thermal expansion coefficient of the pads is set to be smaller than that of the output lines. Accordingly, in the case where the temperature sensitive element is exposed to a temperature change between a high temperature and ordinary temperature, compressive stress can be applied to the output lines by the covering member and the pads. Thus, the fixing force between the output lines and the pads can be increased.

11 Claims, 13 Drawing Sheets

(56) References Cited

U.S. PATENT DOCUMENTS

| | | | |
|---|---|---|---|
| 8,106,740 B2* | 1/2012 | Holoubek | G01K 7/18 338/22 R |
| 8,183,974 B2* | 5/2012 | Wienand | G01K 1/10 338/22 R |
| 2015/0316422 A1* | 11/2015 | Oya | G01K 13/02 374/185 |

* cited by examiner

TEMPERATURE SENSITIVE ELEMENT AND TEMPERATURE SENSOR

CROSS REFERENCE TO RELATED APPLICATIONS

The present application claims priority from Japanese Patent Application Nos. 2014-045181 and 2015-013343, which were filed on Mar. 7, 2014 and Jan. 27, 2015, respectively, the disclosures of which are herein incorporated by reference in their entirety.

BACKGROUND OF THE INVENTION

Field of the Invention

The present invention relates to a temperature sensitive element used for an exhaust system of, for example, an internal combustion engine (such as an automobile engine) and to a temperature sensor including the temperature sensitive element.

Description of Related Art

A conventionally known temperature sensor used for an exhaust system of an internal combustion engine (such as an automobile engine) is a temperature sensor including a temperature sensitive element with a metallic resistor (e.g., a platinum resistor). This temperature sensor detects the temperature of a measurement object (e.g., a gas under measurement) by utilizing a change in the electric resistance of the metallic resistor due to a change in temperature (see Patent Document 1).

One known example of the temperature sensitive element described above is shown in FIG. 12. In this temperature sensitive element, Pt thin-film terminals P3 connected to a platinum resistor P2 are formed on the surface of an alumina substrate P1, and thick-film pads P4 formed of a Pt paste are formed on the surfaces of the thin-film terminals P3. In addition, output lines P5 formed of Pt are connected to the pads P4. The output lines P5 are joined to unillustrated metal core wires, and the pads P4 and the output lines P5 are covered with a covering member P6 formed of glass.

RELATED ART DOCUMENTS

Patent Document 1 is Japanese Patent Application Laid-Open (kokai) No. 2006-234632.

BRIEF SUMMARY OF THE INVENTION

The temperature sensitive element according to the above-described conventional technique is seldom subjected to regular use at high temperature (for example, 850° C. or higher), and requirements for thermal shock resistance are not severe. Therefore, separation of the output lines P5 from the pads P4 has not been a problem.

However, in recent years, engines are being reduced in size, and this shifts the range of use of temperature sensors to higher temperature. Therefore, the range of temperature change widens, and a large change in thermal expansion due to a large temperature change may lead to the fear of separation of the output lines P5 from the pads P4.

When the output lines P5 are separated from the pads P4, the performance of the temperature sensor deteriorates, and therefore it is important to take measures against the separation.

The present invention has been made in view of the foregoing problem, and it is an object of the invention to provide a temperature sensitive element and a temperature sensor which can reduce the possibility of separation of the output lines from the pads.

(1) A first mode of the present invention is a temperature sensitive element comprising a ceramic base; a metallic resistor layer formed on the ceramic base; a pad formed on the ceramic base, the pad having electric conductivity and being electrically connected to the metallic resistor layer; and an output line formed of a metal and joined to a surface of the pad. The temperature sensitive element is characterized by further comprising a covering member disposed on the pad so as to cover at least a portion of the output line, which portion is located on the pad, the covering member containing a glass as a main component and having a thermal expansion coefficient smaller than that of the output line, wherein the pad is formed of a glass-based material which contains, as main components, a metal and a glass, the glass of the pad having a thermal expansion coefficient smaller than that of the ceramic base, and the pad having a thermal expansion coefficient smaller than that of the output line.

In the present first mode, a covering member containing a glass as a main component and having a thermal expansion coefficient smaller than the output line is provided on the pad so as to cover at least a portion of the output line, the portion being located on the pad, the pad is formed of a glass-based material which contains, as main components, a metal and a glass (i.e., a glass whose thermal expansion coefficient is smaller than that of the ceramic base), and the thermal expansion coefficient of the pad is set to be smaller than that of the output line.

Accordingly, even in the case where the temperature sensitive element is exposed to a temperature change between a high temperature of, for example, 850° C. or higher and ordinary temperature, compressive stress can be applied to the output line by the covering member and the pad. As a result, the fixing force between the output line and the pad can be increased. Since the possibility of separation of the output line from the pad can be reduced in this manner, deterioration of durability of the temperature sensitive element can be suppressed.

Notably, the main component means a material which is contained in a member of interest in the largest amount (i.e., a material whose relative content (vol %) is the largest).

(2) A second mode of the present invention is characterized in that the pad has a portion in direct contact with the ceramic base.

In the present second mode, since the pad has a portion in direct contact with the ceramic base, the adhesion between the pad and the ceramic base is high. Namely, since the pad strongly adheres to the ceramic base, the durability of the temperature sensitive element is high.

(3) A third mode of the present invention is characterized in that the pad contains the glass in an amount of 5 vol % to 80 vol % with respect to the total amount of the metal and the glass.

When the proportion between the metal and the glass (the ratio of the glass amount to the total amount of the metal and the glass as 100 vol %) falls within the range of the present third mode, the fixing force between the output line and the pad is high.

(4) A fourth mode of the present invention is characterized in that the pad contains the glass in an amount of 10 vol % to 50 vol % with respect to the total amount of the metal and the glass.

When the proportion between the metal and the glass falls within the range of the present fourth mode, the fixing force between the output line and the pad is higher.

(5) A fifth mode of the present invention is characterized in that a difference in thermal expansion coefficient between the output line and the pad is $0.2 \times 10^{-6}/°C$ to $4.0 \times 10^{-6}/°C$.

When the difference in thermal expansion coefficient between the output line and the pad falls within the range of the present fifth mode, the fixing force between the output line and the pad is high.

Notably, the thermal expansion coefficient difference is a value in a temperature range within which the temperature sensitive element is used (for example, a temperature range of 20 to 300° C.) (this also applies to the case where a temperature range is not prescribed).

(6) A sixth mode of the present invention is characterized in that a difference in thermal expansion coefficient between the output line and the pad is $0.4 \times 10^{-6}/°C$ to $2.5 \times 10^{-6}/°C$.

When the difference in thermal expansion coefficient between the output line and the pad falls within the range of the present sixth mode, the fixing force between the output line and the pad is higher.

(7) A seventh mode of the present invention is characterized in that the glass of the pad has a softening point of 900° C. or higher.

In the present seventh mode, the softening point of the glass of the pad is 900° C. or higher. Therefore, the temperature sensitive element can be used properly at high temperature as high as 900° C.

(8) An eighth mode of the present invention is characterized in that the alkali metal content of the glass of the pad is 0.2 mass % or less.

In the present eighth mode, the alkali metal content of the glass of the pad is 0.2 mass % or less. Therefore, occurrence of migration can be restrained.

Notably, the alkali metal content is a value as reduced to oxide of alkali metal.

(9) A ninth mode of the present invention is characterized in that an intermediate layer containing a metal and a glass is provided between at least a portion of the pad and the ceramic base, and the proportion of the metal in the pad is greater than the proportion of the metal in the intermediate layer.

In the present ninth mode, the proportion of the metal (e.g., Pt) in the pad is larger than the proportion of the metal (e.g., Pt) in the intermediate layer (accordingly, in the case where each of the pad and the intermediate layer is formed of, for example, a metal and a glass, the proportion of the glass in the pad is smaller than the proportion of the glass in the intermediate layer). Therefore, a sufficient degree of electrical continuity can be secured at the pad, and the pad can be firmly joined to the ceramic base through the intermediate layer.

Namely, the present ninth mode can achieve a remarkable effect of simultaneously securing a sufficient degree of electrical continuity between the output line and the metallic resistor layer and securing a sufficiently large fixing force between the pad and the ceramic base.

(10) A tenth mode of the present invention is characterized in that the glass of the covering member is the same as the glass of the pad.

In the present tenth mode, since the glass of the covering member is the same in composition as the glass of the pad, the thermal expansion coefficient of the covering member is close to that of the pad (as compared with the case where the glass composition of the covering member is not the same as the glass composition of the pad). Therefore, a high separation restraining effect is attained. In particular, in the case of a structure in which the covering member is in direct contact with the pad, the adhesion between the covering member and the pad is high. Therefore, a higher separation restraining effect is attained.

(11) An eleventh mode of the present invention is a temperature sensor comprising a temperature sensitive element according to any one of the above-described first through tenth modes.

The temperature sensor including the above-described temperature sensitive element can restrain the above-described separation in the temperature sensitive element even when it is used at a high temperature of, for example, 850° C. or higher. Therefore, the temperature sensor is high in high temperature durability, and can be properly used at high temperature.

Below, the components of the present invention will be described.

The metallic resistor (temperature measurement resistor) constituting the metallic resistor layer is a substance whose resistance changes with temperature. An example of the metallic resistor is Pt. Notably, examples of the metallic resistor are Pt100 and Pt10 prescribed in JIS C 1604-1997.

Examples of the metal contained in the output line and the pad include Pt, a Pt alloy, Ni, an Ni—Cr alloy, etc. Examples of the Pt alloy are those which contain Pt as a main component; for example, Pt—Rh, Pt—Ir, Pt—Pd, Pt—Sr, and Pt—$ZrO_2$. Notably, an example of the output line is a wire material formed of Pt or the above-mentioned Pt alloy.

Examples of the glass contained in the pad or the intermediate layer are as follows.

[Silicate glass] The silicate glass contains $SiO_2$, and also contains an alkaline earth metal oxide (MgO, CaO, BaO, SrO).

[Aluminosilicate glass] The aluminosilicate glass contains $SiO_2$ and $Al_2O_3$, and also contains an alkaline earth metal oxide (MgO, CaO, BaO, SrO).

[Borate glass] The borate glass contains $B_2O_3$, and also contains an alkaline earth metal oxide (MgO, CaO, BaO, SrO).

[Borosilicate glass] The borosilicate glass contains $B_2O_2$ and $SiO_2$, and also contains an alkaline earth metal oxide (MgO, CaO, BaO, SrO).

[Phosphosilicate glass] The phosphosilicate glass contains $P_2O_5$ and $SiO_2$, and also contains an alkaline earth metal oxide (MgO, CaO, BaO, SrO).

It is preferred that the glass-based material contain a metal and a glass (i.e., a glass whose thermal expansion coefficient is smaller than that of the ceramic base) only. However, the glass-based material may be prepared to contain a metal and a glass as main components (in a proportion greater than 50 vol %) and contain other components. For example, a ceramic filler may be mixed. Since the ceramic filler can lower the fluidity of the glass, heat resistance can be improved.

Notably, ceramics such as alumina, magnesia, zircon, spinel, cordierite, mullite, steatite, silicon carbide, silicon nitride, and aluminum nitride can be used as a ceramic filler.

A crystallized glass can be used as the glass of the glass-based material. Since use of the crystallized glass can lower the fluidity of the glass, heat resistance can be improved.

Various type of materials similar to those used for the above-described glass can be used as the glass component of the covering member. Notably, the glass component of the covering member may differ from the glass component of the pad or the intermediate layer.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE INVENTION

Preferred modes (embodiments) of a temperature sensitive element and a temperature sensor of the present invention will now be described.

First Embodiment a) First, the structure of a temperature sensor of the present first embodiment will be described.

Figure 1:
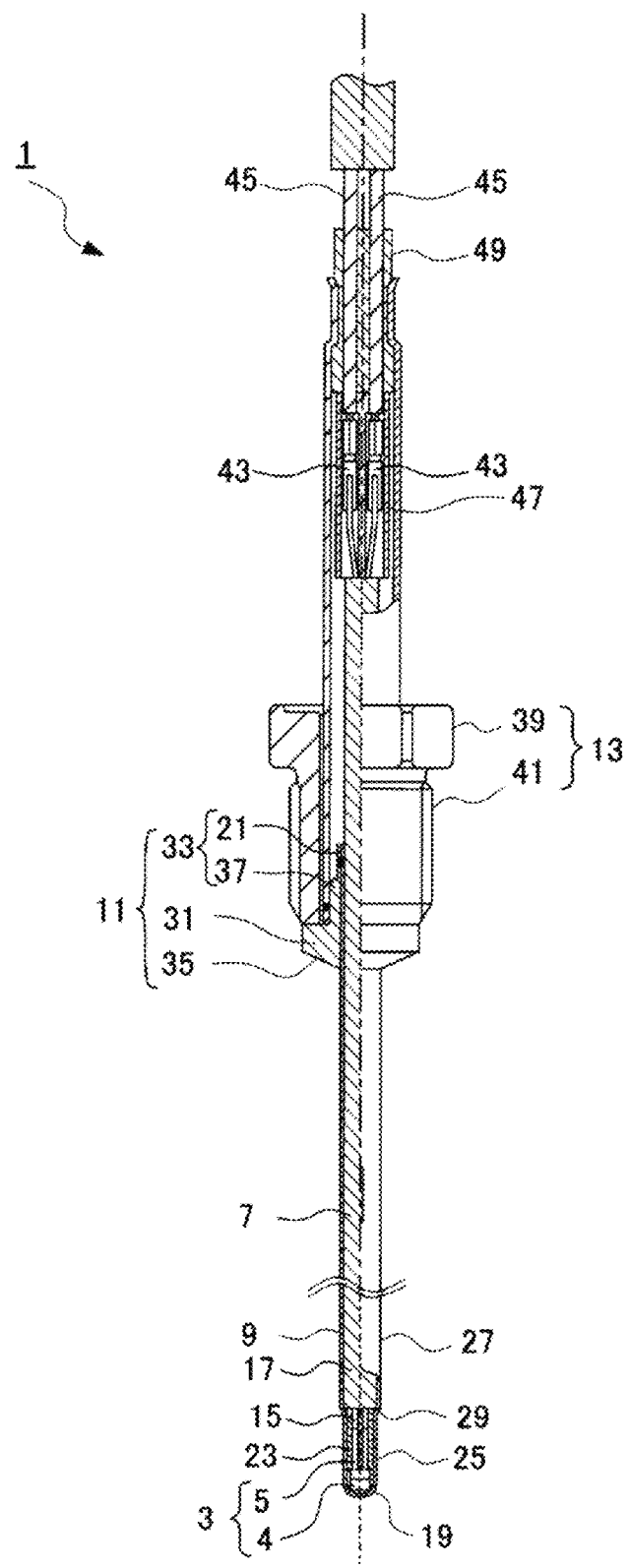
FIG. 1 is a partially cutaway cross-sectional view illustrating the structure of a temperature sensor of a first embodiment.

As shown in FIG. 1, the temperature sensor 1 of the present embodiment is attached to a gas flow pipe such as an exhaust pipe of an internal combustion engine, whereby the temperature sensor 1 is disposed in the flow pipe through which a measurement target gas flows. The temperature sensor 1 is used to detect the temperature of the measurement target gas (exhaust gas).

Notably, the lengthwise direction of the temperature sensor 1 is an axial direction and the vertical direction in FIG. 1. Also, a forward end side of the temperature sensor 1 is the lower side in FIG. 1, and the rear end side is the upper side in FIG. 1.

The temperature sensor 1 mainly includes a temperature sensitive element 3, a sheath portion 7, a metal tube 9, a mounting portion 11, and a nut portion 13.

The temperature sensitive element 3 is a temperature detecting element disposed in a flow pipe through which a measurement target gas flows and is disposed inside the metal tube 9.

The temperature sensitive element 3 includes a temperature sensitive portion 4 including an internal metallic resistor having an electric characteristic (electric resistance value) that varies with temperature; and a pair of output lines (element electrode lines) 5 connected to the temperature sensitive portion 4, as will be described later in detail.

The sheath portion 7 holds a pair of metal core wires 15 (sheath core wires 15) inside a sleeve 17 in an insulated condition. The sheath portion 7 includes the sleeve 17 made of a metal, the pair of metal core wires 15 made of a conductive metal, and insulating powder (not shown) that holds the two metal core wires 15 so as to electrically insulate the sleeve 17 and the two metal core wires 15 from each other.

The metal tube 9 is a member formed by closing a forward end of a tubular member extending in the axial direction, and is formed of a corrosion-resistant metal (for example, a stainless steel alloy such as SUS310S, which is also a heat resistant metal).

The metal tube 9 is formed by deep-drawing a steel plate into the shape of a tube extending in the axial direction such that its forward end (bottom) 19 is closed and its rear end is open. The axial dimension of the metal tube 9 is set such that the rear end of the tube abuts against the inner surface of a second step portion 21 of the mounting portion 11.

In addition, the temperature sensitive element 3 and cement (a holding member) 23 are disposed inside the metal tube 9. The metal tube 9 has a small-diameter portion 25 formed at its forward end, and a large-diameter portion 27 larger in diameter than the small-diameter portion 25 is formed rearward of the small-diameter portion 25. The small-diameter portion 25 and the large-diameter portion 27 are connected through a step portion 29.

The cement 23 fills the space around the temperature sensitive element 3 and holds the temperature sensitive element 3 to prevent it from vibrating. The cement 23 used is preferably a material having high thermal conductivity, high heat resistance, and high insulating performance.

It is preferred to use a cement formed mainly of an oxide such as $Al_2O_3$ or MgO, a nitride such as AlN, TiN, $Si_3N_4$, or BN, or a carbide such as SiC, TiC, or ZrC. Alternatively, it is preferred to use a cement formed mainly of an oxide such as $Al_2O_3$ or MgO, a nitride such as AlN, TiN, $Si_3N_4$, or BN, or a carbide such as SiC, TiC, or ZrC and mixed with an inorganic binder such as $Al_2O_3$, $SiO_2$, or MgO.

The mounting portion 11 is a member for supporting the metal tube 9 and surrounds a rear end portion of the outer circumferential surface of the metal tube 9 to support the metal tube 9 with at least the forward end of the metal tube 9 exposed to the outside. The mounting portion 11 includes a protruding portion 31 protruding radially outward and a rear sheath portion 33 located rearward of the protruding portion 31 and extending in the axial direction.

The protruding portion 31 is an annular member including a mounting seat 35 provided on the forward end side. The mounting seat 35 is a tapered member having a diameter decreasing toward the forward end side, and this tapered shape conforms to a tapered shape formed at a sensor mounting position of an exhaust pipe (not shown) and having a diameter increasing toward the rear end side.

When the above-mentioned mounting portion 11 is disposed at the sensor mounting position of the exhaust pipe, the mounting seat 35 comes into contact with the tapered portion of the sensor mounting position, and leakage of the exhaust gas to the outside of the exhaust pipe is thereby prevented.

The rear sheath portion 33 is a member formed into an annular shape, and has a first step portion 37 located on the forward end side and the second step portion 21 smaller in outer diameter than the first step portion 37.

The nut portion 13 includes a hexagonal nut portion 39 and a threaded portion 41.

The metal core wires 15 have forward end portions electrically connected at their welding points (joints: not shown) to the output lines 5 of the temperature sensitive element 3, and the rear end portions of the metal core wires 15 are connected to crimp terminals 43 by resistance welding. Specifically, the metal core wires 15 are connected at their rear ends to connection lead wires 45 of an external circuit such as an electronic control unit (ECU) of a vehicle through the crimp terminals 43.

The pair of metal core wires 15 are insulated from each other by an insulating tube 47, and the pair of crimp terminals 43 are insulated from each other also by the insulating tube 47. Each of the lead wires 45 is a conducting wire coated with an insulating coating and is disposed to extend through the inside of a heat resistant rubber-made auxiliary ring 49.

b) Next, the structure of the temperature sensitive element 3, which is a main portion of the present first embodiment, will be described.

Figure 2A:
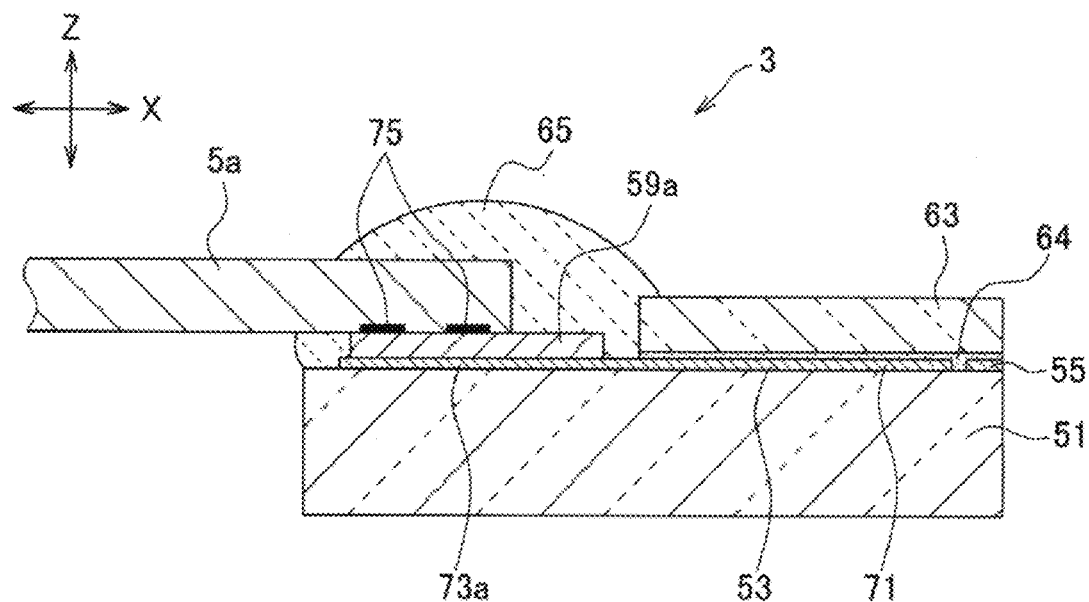
FIG. 2(a) is a cross-sectional view taken along line A-A in FIG. 2(b)
Figure 2B:
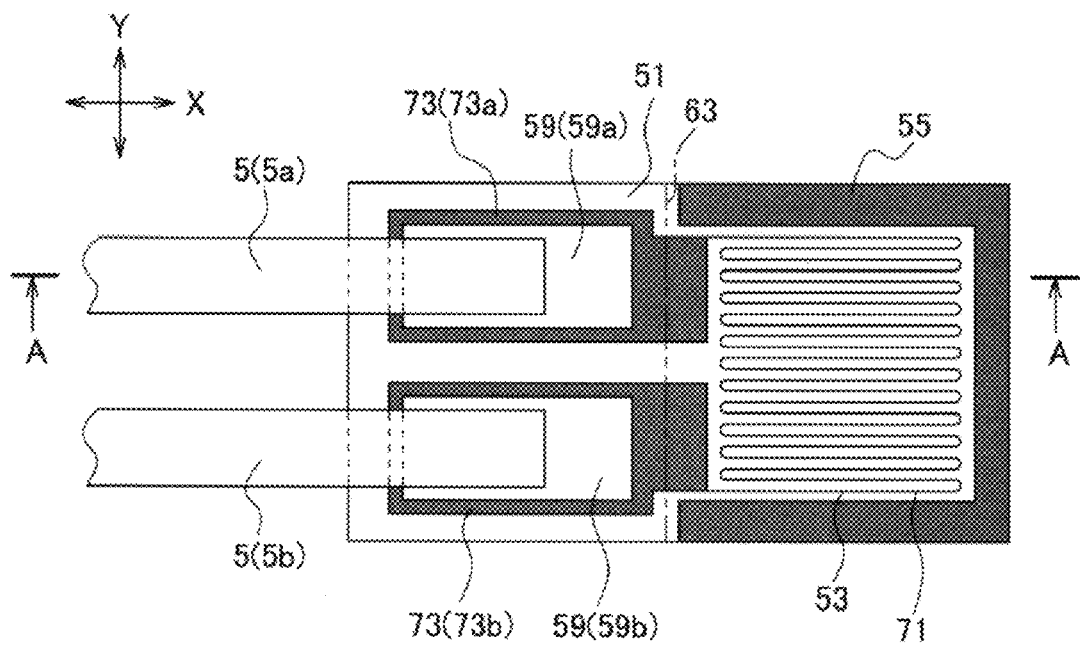
FIG. 2(b) is a plan view of the temperature sensitive element of the first embodiment (however, a covering member is removed, and a ceramic covering layer is illustrated as transparent).
Figure 3:
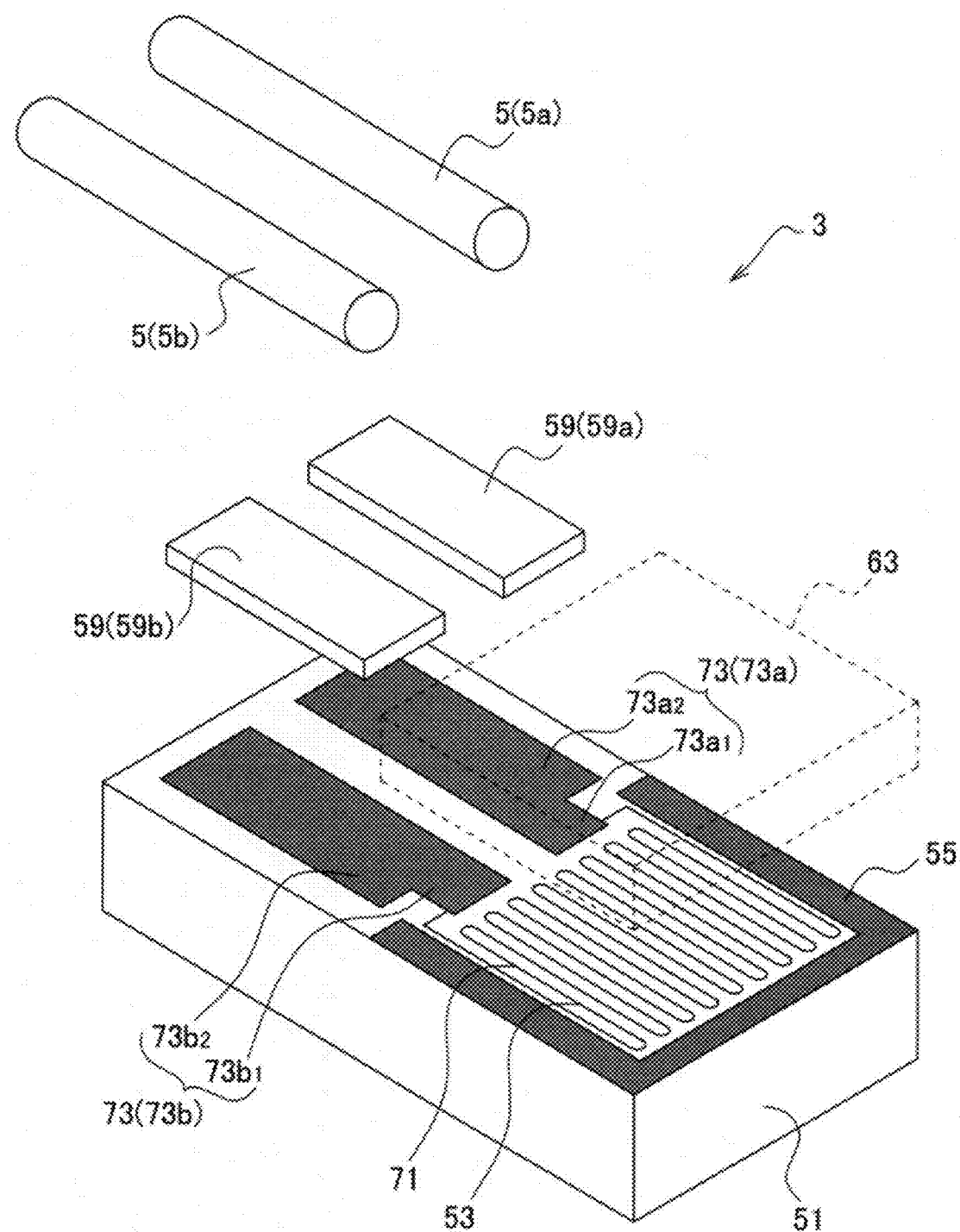
FIG. 3 is an exploded perspective view illustrating the temperature sensitive element of the first embodiment (however, the covering member is removed, and the ceramic covering layer is illustrated as transparent).

As shown in FIGS. 2(a), 2(b), and 3, the temperature sensitive element 3 includes a ceramic substrate (ceramic base) 51; a metallic resistor layer 53 formed on one main face (the upper main face in FIG. 2(a)) of the ceramic substrate 51; a volatilization suppressing layer 55 formed on the same main face of the ceramic substrate 51; a pair of pads 59a and 59b (collectively referred to as pads 59) formed on the same main face to be located on the rear end side (the left side of FIG. 2(a)) and partially cover the surface of the metallic resistor layer 53; the above-mentioned pair of output lines 5a and 5b (collectively referred to as output lines 5) joined to the surfaces of the pads 59; a ceramic covering layer 63 which covers the upper side (the upper side in FIG. 2(a)) of a forward end portion of the metallic resistor layer 53; and a covering member 65 which covers forward end portions of the output lines 5, the pair of pads 59, etc.

The temperature sensitive portion 4 is a plate-shaped portion of the temperature sensitive element 3 except for the output lines 5.

Each of the components will next be described.

The ceramic substrate 51 is a rectangular plate (in plan view) formed of, for example, alumina with a purity of 99.9%. The thermal expansion coefficient of the ceramic substrate 51 is, for example, $7.0 \times 10^{-6}/°$ C. (20 to 300° C.)

The metallic resistor layer 53 is an electrically conductive thin film formed from a metallic resistor (e.g., Pt) and has a thickness of, for example, 0.5 to 3.0 μm. The metallic resistor layer 53 includes a fine-line portion 71 on the forward end side and a pair of terminal portions 73a and 73b (collectively referred to as terminal portions 73) on the rear end side.

The fine-line portion 71 of the metallic resistor layer 53 is a fine line with a small line width (e.g., a width of 20 μm) and is formed so as to meander a plurality of times within a region covered with the ceramic covering layer 63.

The terminal portions 73 are terminals (larger in width than the fine-line portion 71) connected to a pair of rear ends of the fine-line portion 71 and formed so as to extend toward the rear end side.

Specifically, the terminal portions 73 are composed of rectangular terminal forward end portions 73a1 and 73b1 (connected to the fine-line portion 71) on the forward end side and rectangular terminal rear end portions 73a2 and 73b2 on the rear end side, and each have a convex shape (in a plan view) as a whole. The terminal rear end portions 73a2 and 73b2 are terminals larger in width (dimension in the Y-direction in FIG. 2(b)) and area than the terminal forward end portions 73a1 and 73b1.

The volatilization suppressing layer 55 is a layer formed of the same material as that of the metallic resistor layer 53 and having the same thickness as that of the metallic resistor layer 53, and is formed to have a squarish C-like shape (in plan view) so as to surround three sides (a side on the forward end side and opposite sides in the width direction (Y direction)) of the fine-line portion 71 of the metallic resistor layer 53 in the same plane as the plane of the metallic resistor layer 53. Therefore, the volatilization suppressing layer 55 generates platinum vapor pressure as a result of vaporization of platinum forming this layer, whereby vaporization or volatilization of the material of the metallic resistor layer 53 is suppressed.

The pads 59 are rectangular (in plan view), electrically conductive layers formed on the surfaces of the terminal rear end portions 73a2 and 73b2 in such a manner that their outer circumferences are located slightly inwardly of the outer circumferences of the terminal rear end portions 73a2 and 73b2. Each of the pads 59 is a thick film (having a thickness of, for example, 1 to 30 μm) thicker than the metallic resistor layer 53.

The pads 59 are formed of a material mixture of Pt and a glass (i.e., a glass having a thermal expansion coefficient smaller than that of the ceramic substrate 51). The proportion between the Pt and the glass is such that the amount of glass is, for example, 40 vol % within the range of 5 vol % to 80 vol % (preferably, 10 vol % to 50 vol %) with respect to the total amount of Pt and glass as 100 vol %.

The pads 59 may be formed using a material other than the material mixture of Pt and a glass; specifically using a glass-based material prepared by adding, for example, a ceramic filler or the like to a metal and a glass (a glass-based material containing a metal and a glass as main components).

The glass contained in the pads 59 is, for example, high heat-resistant glass having a transition point of 700° C. or higher and a softening point of 900° C. or higher, and the composition of the high heat-resistant glass is, for example, $SiO_2$: 52 wt %, CaO: 25 wt %, $Al_2O_3$: 15 wt %, and SrO: 8 wt %.

As the above-mentioned glass, there is used a glass whose thermal expansion coefficient is smaller than the thermal expansion coefficient of the ceramic substrate 51 as described above and is also smaller than the thermal expansion coefficient of the output lines 5 (for example, a glass having a thermal expansion coefficient within the range of $4.0 \times 10^{-6}/°$ C. to $6.8 \times 10^{-6}/°$ C. (20 to 300° C.)

Notably, as such glass, there can be employed various types of glasses having thermal expansion coefficients smaller than those of the ceramic substrate 51 and the output lines 5; for example, the above-described silicate glass, aluminosilicate glass, borate glass, borosilicate glass, and phosphosilicate glass.

The thermal expansion coefficient of the pads 59 containing the above-mentioned metal and glass is within the range of, for example, $6.0 \times 10^{-6}/°$ C. to $9.5 \times 10^{-6}/°$ C. in a temperature range within which the temperature sensor 1 is used (e.g., 20 to 300° C.), and is set to be smaller than the thermal expansion coefficient of the output lines 5.

The difference in thermal expansion coefficient (the thermal expansion coefficient difference) between the output lines 5 and the pads 59 is, for example, $2.0 \times 10^{-6}/°$ C. within the range of, for example, $0.2 \times 10^{-6}/°$ C. to $4.0 \times 10^{-6}/°$ C. (specifically, the range of $0.4 \times 10^{-6}/°$ C. to $2.5 \times 10^{-6}/°$ C.).

Each of the output lines 5 is formed from a Pt wire material (Pt wire) having a thermal expansion coefficient of $9.5 \times 10^{-6}/°$ C. (20-300° C.), and the forward ends of the output lines 5 are joined to the surfaces of the pads 59. A Pt alloy may be used for the output lines 5.

These output lines 5 are joined to the pads 59 by parallel welding (resistance welding), and therefore joints 75 between the output lines 5 and the pads 59 (see FIG. 2(*a*)) are formed into a spot shape.

The ceramic covering layer 63 is a substrate formed of, for example, alumina with a purity of 99.9%. The ceramic covering layer 63 covers the fine-line portion 71 of the metallic resistor layer 53, the forward end portions of the terminal forward end portions 73*a*1 and 73*b*1 of the metallic resistor layer 53, and the volatilization suppressing layer 55.

The ceramic covering layer 63 is joined to the ceramic substrate 51 etc. through a joint layer 64 (see FIG. 2(*a*)) formed of, for example, alumina with a purity of 99.9%.

The covering member 65 is a glass covering layer formed of, for example, the same glass material as the pads 59 (the glass material of the covering member 65 may differ from that of the pads 59). The thermal expansion coefficient of the covering member 65 is smaller than that of the output lines 5. Forward end portions of the output lines 5, the pads 59, and a rear end portion of the ceramic covering layer 63 are airtightly covered with the covering member 65.

Particularly, in the present first embodiment, as described above, the covering member 65 containing a glass as a main component and having a thermal expansion coefficient smaller than that of the output lines 5 is disposed on the pads 59 so as to cover at least portions of the output lines 5, which portions are located on the pads 59, the pads 59 are formed of a glass-based material which contains, as main components, a metal and a glass having a thermal expansion coefficient smaller than that of the ceramic substrate 51, and the thermal expansion coefficient of the pads 59 are set to be smaller than that of the output lines 5.

Specifically, the proportion between Pt and the glass of the pads 59 is such that the amount of the glass falls within the range of 5 vol % to 80 vol % (preferably 10 vol % to 50 vol %) with respect to the total amount of Pt and the glass as 100 vol %. In addition, the thermal expansion coefficient of the pads 59 is smaller than that of the output lines 5, and the difference in thermal expansion coefficient between the output lines 5 and the pads 59 falls within the range of $0.2 \times 10^{-6}/°$ C. to $4.0 \times 10^{-6}/°$ C. (preferably, $0.4 \times 10^{-6}/°$ C. to $2.5 \times 10^{-6}/°$ C.).

c) Next, a method of manufacturing the temperature sensitive element 3 will be described.

Figure 4:
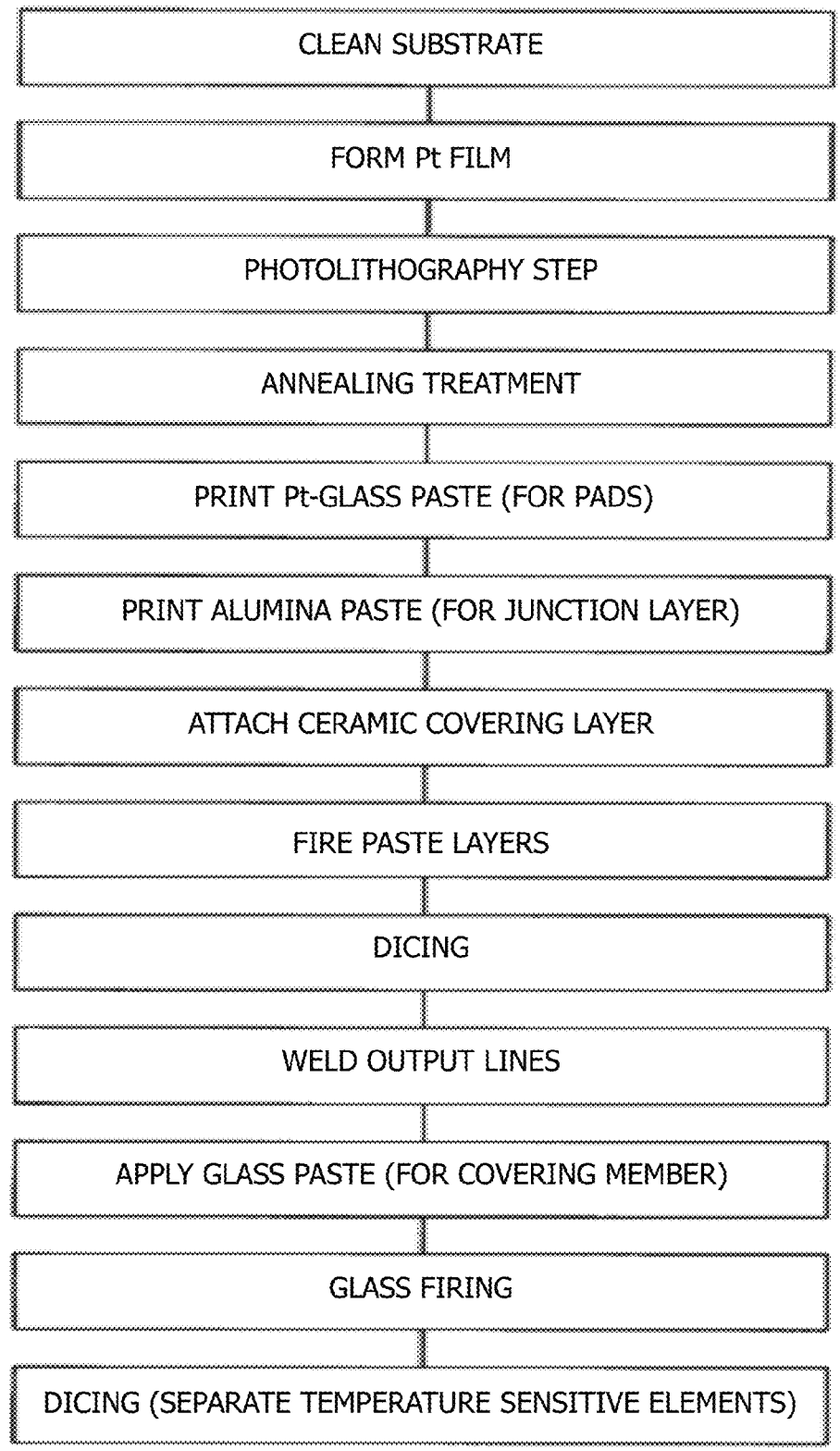
FIG. 4 is an explanatory chart showing a process of manufacturing the temperature sensitive element of the first embodiment step-by-step.
Figure 5A:
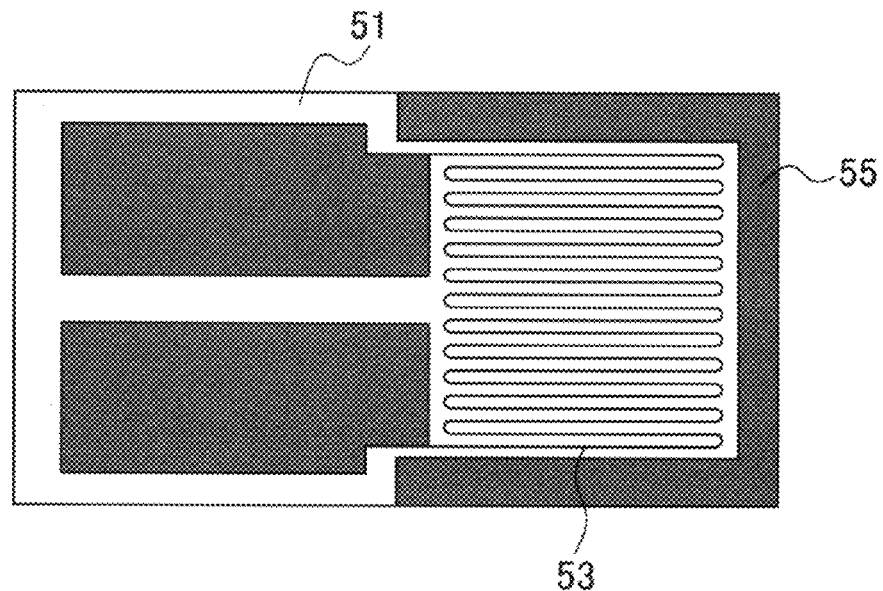
FIGS. 5(a) through 5(c) are explanatory plan views illustrating the procedure of manufacturing the temperature sensitive element of the first embodiment.
Figure 5B:
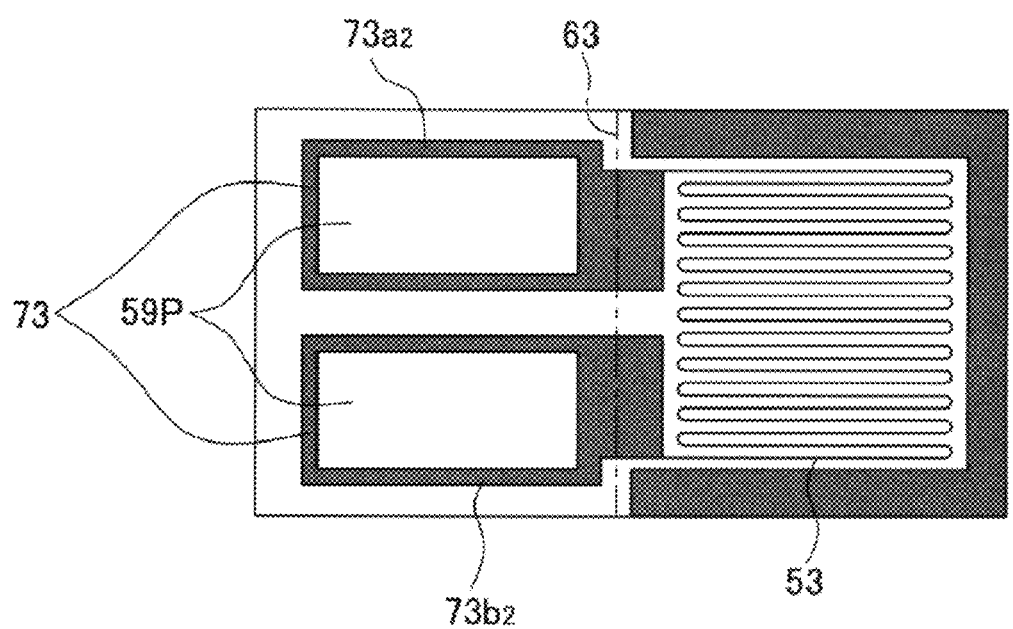
Figure 5C:
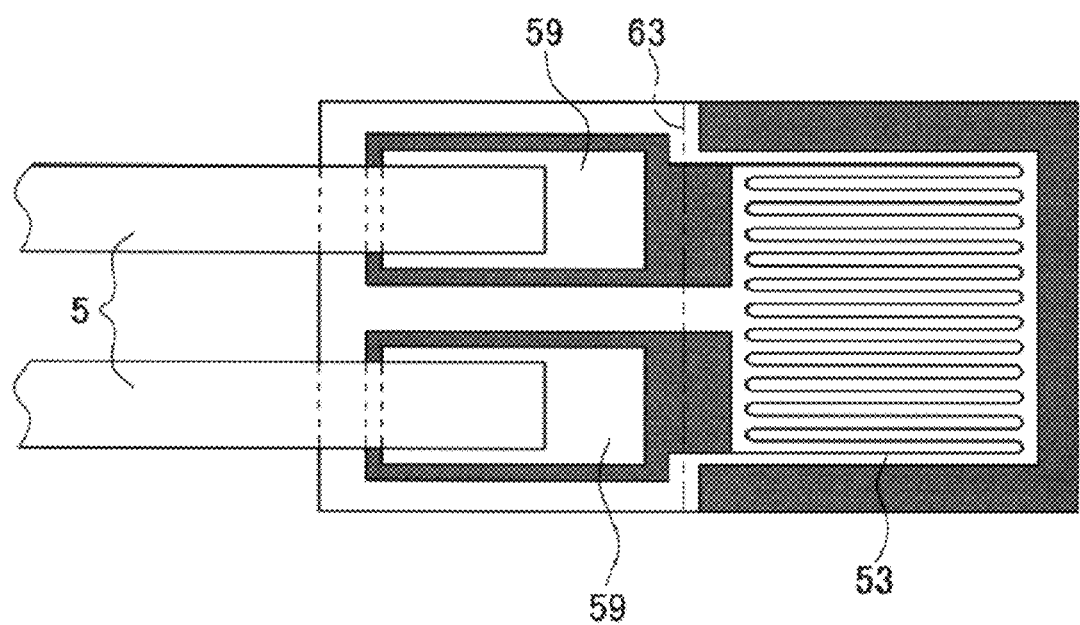

As shown in FIG. 4 and FIGS. 5(*a*) through 5(*c*), first, a base material (not shown) for ceramic substrates 51 is ultrasonically cleaned. The base material is a plate-shaped material used to produce a plurality of temperature sensitive elements 3 from one large-sized substrate. FIGS. 5(*a*) through 5(*c*) show a portion corresponding to one temperature sensitive element 3.

Next, a Pt film (not shown) is formed on part of the surface of the base material (i.e., each ceramic substrate 51) by a well-known PVD method (e.g., a sputtering method), in order to form the metallic resistor layer 53 and the volatilization suppressing layer 55. Specifically, the Pt film is formed on surface portions on which the metallic resistor layer 53 and the volatilization suppressing layer 55 are to be formed.

Next, as shown in FIG. 5(*a*), the metallic resistor layer 53 and the volatilization suppressing layer 55 are formed using a well-known photolithograph process including formation of a resist film, light-exposure treatment, development, etching, removal of the resist film, etc.

Next, annealing treatment (aging treatment) is performed. In the annealing treatment, the base material is heated to 1,000 to 1,400° C. in air or an $N_2$ atmosphere, and is left to cool.

Next, for example, 10 parts by mass of a cellulosic resin is added to 100 parts by mass of a mixture of 93 parts by mass of a Pt material (powder) and 7 parts by mass of glass powder having the above-described composition. Then, a Pt-glass paste 59P is produced using the above-prepared material such that the Pt-glass paste 59P has a composition corresponding to that of the pads 59.

Next, as shown in FIG. 5(*b*), the Pt-glass paste 59P is applied, by means of printing, to areas where the pads 59 are to be formed. Specifically, the Pt-glass paste 59P is applied, by means of printing, to the surfaces of the terminal rear end portions 73*a*2 and 73*b*2 of the terminal portions 73 of the metallic resistor layer 53 (within regions inside the outer circumferences of the terminal rear end portions 73*a*2 and 73*b*2) to form rectangular paste layers.

Next, 90 parts by mass of alumina powder and 10 parts by mass of a butyral resin are added together to produce an alumina paste (not shown), and the alumina paste is applied, by means of printing, to an area on the base material (i.e., the ceramic substrate 51) that is to be covered with the ceramic covering layer 63 (an area where the joint layer 64 is to be formed).

Next, the ceramic covering layer 63 (which is a fired ceramic substrate) is overlaid on the printed alumina paste layer, as shown in FIG. 5(*b*) (the ceramic covering layer 63 is illustrated as transparent).

Next, the base material (accordingly, the ceramic substrate 51) with the above-described layers etc. disposed on its surface is fired at a firing temperature of 1,000 to 1,400° C. for 2 hours. As a result, the paste layers were fired.

Next, the base material is diced into substrates having a work size suitable for welding described later.

Next, as shown in FIG. 5(*c*), output lines 5 are placed on the pads 59 and joined thereto by parallel welding (resistance welding).

Next, 90 parts by mass of a glass material (powder) having a composition corresponding to that of the covering member 65 and 10 parts by mass of a butyral resin are added together to produce a glass paste (not shown), and the glass paste is applied to an area where the covering member 65 is to be formed. Namely, the glass paste is applied so as to cover forward end portions of the output lines 5, the pads 59, and a rear end portion of the ceramic covering layer 63.

Next, the resultant layer of the glass paste is fired at a firing temperature of, for example, 1,000 to 1,400° C. for 2 hours.

Next, the substrate having the work size is diced to separate temperature sensitive elements 3 from each other.

The temperature sensitive elements 3 can be produced through the steps described above.

A temperature sensor 1 can be produced by installing a temperature sensitive element 3, which has been produced in the manner described above, in a conventional manner.

d) Next, the effect of the present first embodiment will be described.

In the temperature sensitive element 3 of the present first embodiment, the covering member 65 containing a glass as a main component and having a thermal expansion coefficient smaller than that of the output lines 5 is disposed on the pads 59 so as to cover at least portions of the output lines 5, which portions are located on the pads 59, the pads 59 are formed of a glass-based material which contains, as main components, a metal and a glass having a thermal expansion coefficient smaller than that of the ceramic substrate 51, and the thermal expansion coefficient of the pads 59 are set to be smaller than that of the output lines 5.

Specifically, the pads 59 are formed of Pt and a glass such that the amount of glass falls within the range of 5 vol % to 80 vol % (preferably 10 vol % to 50 vol %) with respect to the total amount of Pt and the glass as 100 vol %. In addition, the thermal expansion coefficient of the pads 59 is smaller than that of the output lines 5, and the difference in thermal expansion coefficient between the output lines 5 and the pads 59 falls within the range of $0.2 \times 10^{-6}/°$ C. to $4.0 \times 10^{-6}/°$ C. (preferably, $0.4 \times 10^{-6}/°$ C. to $2.5 \times 10^{-6}/°$ C.).

Accordingly, even in the case where the temperature sensitive element 3 is exposed to a temperature change between a high temperature of, for example, 850° C. or higher and ordinary temperature, compressive stress can be applied to the output lines 5 by the covering member 65 and the pads 59. As a result, the fixing force between the output lines 5 and the pads 59 can be increased. Since separation of the output lines 5 from the pads 59 can be restrained in this manner, deterioration of the durability of the temperature sensitive element 3 can be suppressed.

Also, in the present first embodiment, since the softening point of the glass contained in the pads 59 is 900° C. or higher, the temperature sensitive element 3 can be used properly at high temperature as high as 900° C.

Further, in the present first embodiment, the alkali metal content of the glass contained in the pads 59 is 0.2% by mass or less. Therefore, occurrence of migration can be restrained.

Also, in the present first embodiment, the output lines 5 and the pads 59 are covered with the covering member 65 formed of a glass, and the glass component of the covering member 65 is the same as that of the pads 59. Therefore, since the degree of thermal expansion of the covering member 65 is close to that of the pads 59, a high separation restraining effect is attained.

Second Embodiment

Next, a second embodiment will be described; however, description of details similar to those of the above-described first embodiment is omitted.

A temperature sensor of the present second embodiment differs from the temperature sensitive element of the above-described first embodiment in the structures of the pads and the terminal portions of the metallic resistor layer of the temperature sensitive element.

Figure 6A:
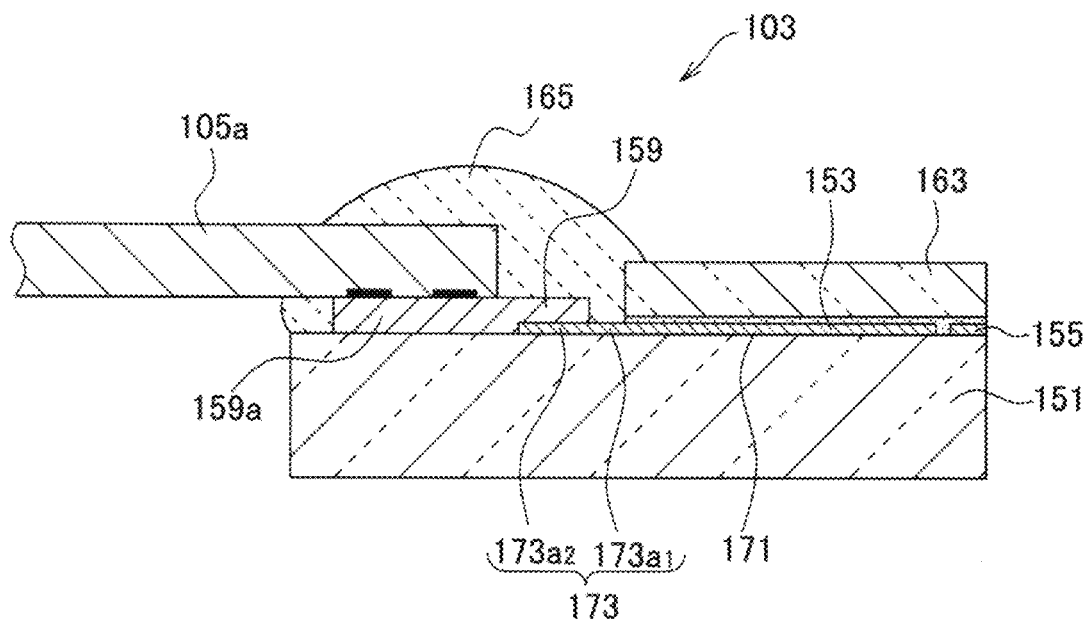
FIG. 6(a) is a cross-sectional view taken along line B-B in FIG. 6(b)
Figure 6B:
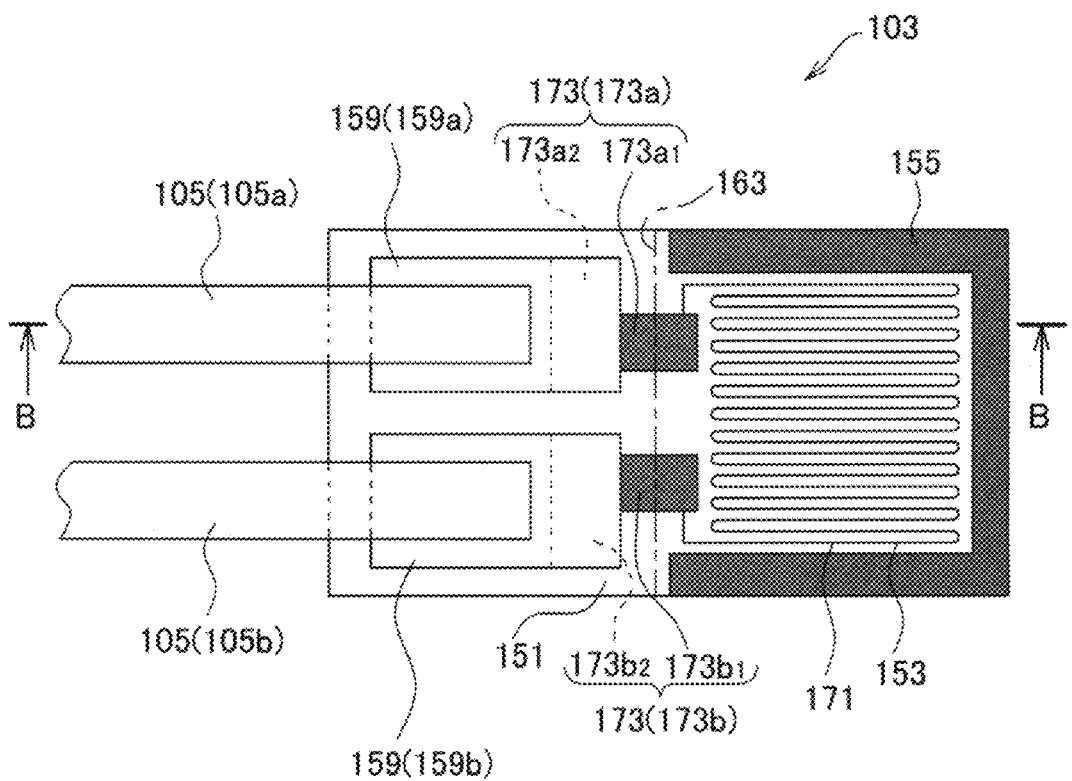
FIG. 6(b) is a plan view of a temperature sensitive element of a second embodiment (however, a covering member is removed, and a ceramic covering layer is illustrated as transparent).
Figure 7:
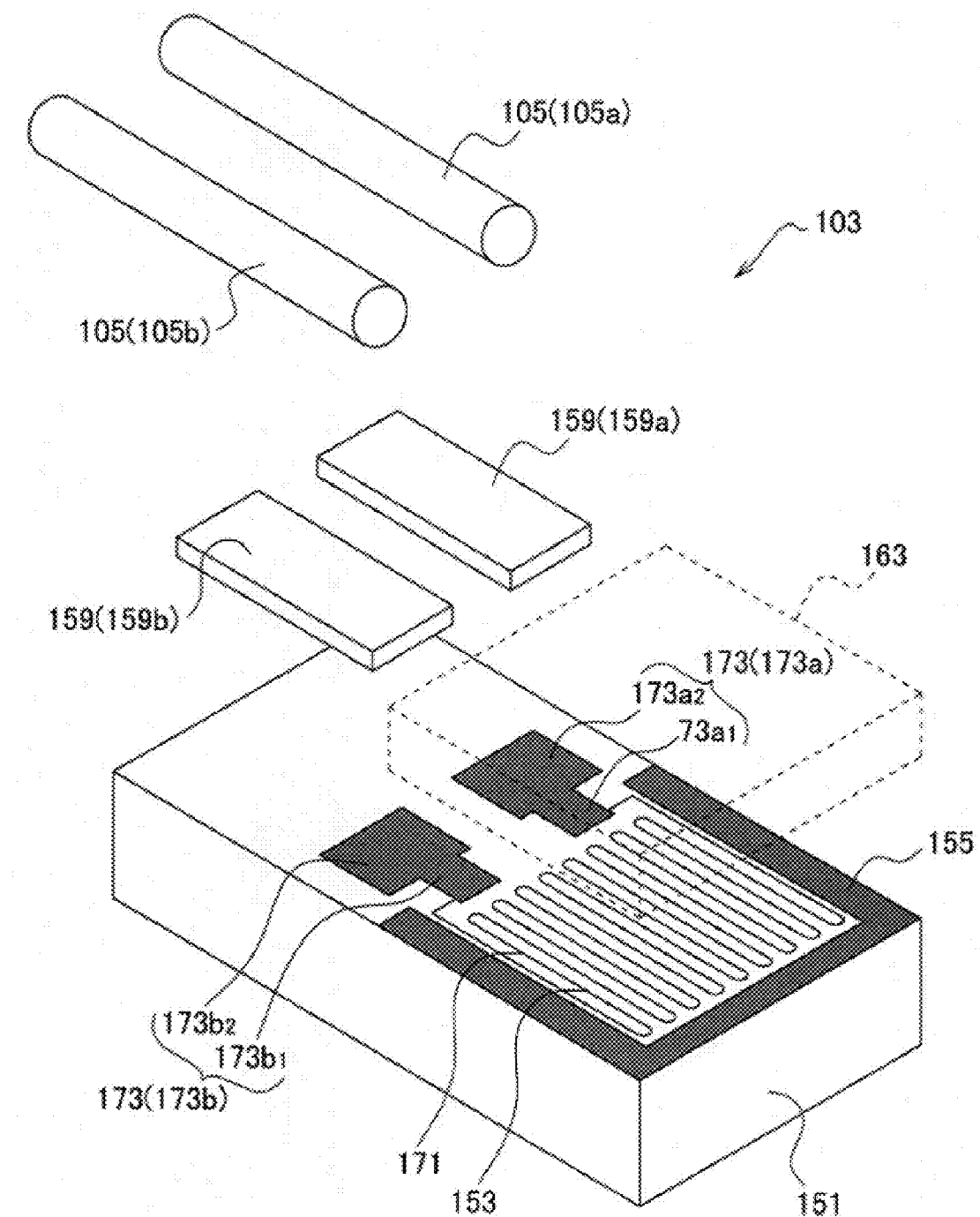
FIG. 7 is an exploded perspective view illustrating the temperature sensitive element of the second embodiment (however, the covering member is removed, and the ceramic covering layer is illustrated as transparent).

As shown in FIGS. 6(*a*), 6(*b*), and 7, like the temperature sensitive element of the above-described first embodiment, the temperature sensitive element 103 of the second embodiment includes a ceramic substrate 151; a metallic resistor layer 153 formed on one main face (the upper main face in FIG. 6(*a*)) of the ceramic substrate 151; a volatilization suppressing layer 155 formed on the same main face; a pair of pads 159*a* and 159*b* (collectively referred to as pads 159) formed on the same main face to be located on the rear end side (on the left side of FIG. 6(*a*)) and partially cover the surface of the metallic resistor layer 153; a pair of output lines 105*a* and 105*b* (collectively referred to as output lines 105) joined to the surfaces of the pads 159; a ceramic covering layer 163 covering the upper side (the upper side in FIG. 6(*a*)) of a forward end portion of the metallic resistor layer 153; and a covering member 165 covering forward end portions of the output lines 105, the pair of pads 159, etc.

In the present second embodiment as well, the metallic resistor layer 153 includes a fine-line portion 171 meandering a plurality of times on the forward end side and a pair of terminal portions 173*a* and 173*b* (collectively referred to as terminal portions 173) connected to the opposite ends of the fine-line portion 171. However, the planar shape of each terminal portion 173 differs from that employed in the first embodiment.

Specifically, although the terminal portions 173 are composed of rectangular terminal forward end portions 173*a*1 and 173*b*1 and rectangular terminal rear end portions 173*a*2 and 173*b*2 (which are larger in width and area than the terminal forward end portions 173*a*1 and 173*b*1), the terminal rear end portions 173*a*2 and 173*b*2 do not extend to regions where the output lines 105 are present (in plan view).

The pads 159 cover the entire surfaces of the terminal rear end portions 173*a*2 and 173*b*2, extend toward the rear end side while maintaining the same width, and are in direct contact with the ceramic substrate 151 on the rear end side.

Namely, in regions on the lower side (the lower side in FIG. 6(*a*)) of the output lines 105 and areas located outward of the regions in the radial direction (in the vertical direction in FIG. 6(*b*)), the terminal rear end portions 173*a*2 and 173*b*2 are not present, and the pads 159 are in direct contact with the ceramic substrate 151 and adhere thereto.

Notably, the materials of these members are identical with those of the above-described first embodiment, and the procedure of manufacturing the temperature sensor of the present second embodiment is basically the same as the procedure of manufacturing the temperature sensor of the first embodiment (although the shapes of the pads 159 and the terminal portions 173 differ from those in the first embodiment).

The temperature sensor of the present second embodiment achieves the same effects as those achieved by the above-described temperature sensor of the first embodiment. In addition, the temperature sensor of the present second embodiment has an advantage in that the joint strength between the pads 159 and the ceramic substrate 151 is high, because the pads 159 (formed of Pt and a glass) is in direct contact with the ceramic substrate 151.

Third Embodiment

Next, a third embodiment will be described; however, description of details similar to those of the above-described second embodiment is omitted.

A temperature sensor of the present third embodiment differs from the temperature sensitive element of the above-described second embodiment in that intermediate layers are provided between the pads and the ceramic substrate of the temperature sensitive element.

a) First, the structure of the temperature sensitive element of the present third embodiment will be described.

Figure 8A:
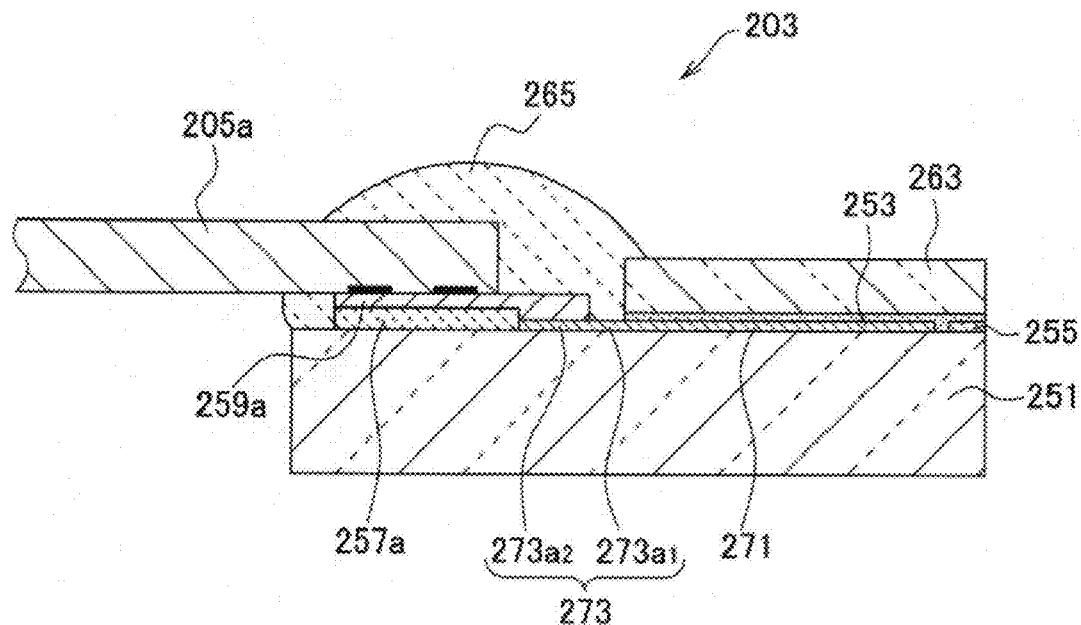
FIG. 8(a) is a cross-sectional view taken along line C-C in FIG. 8(b)
Figure 8B:
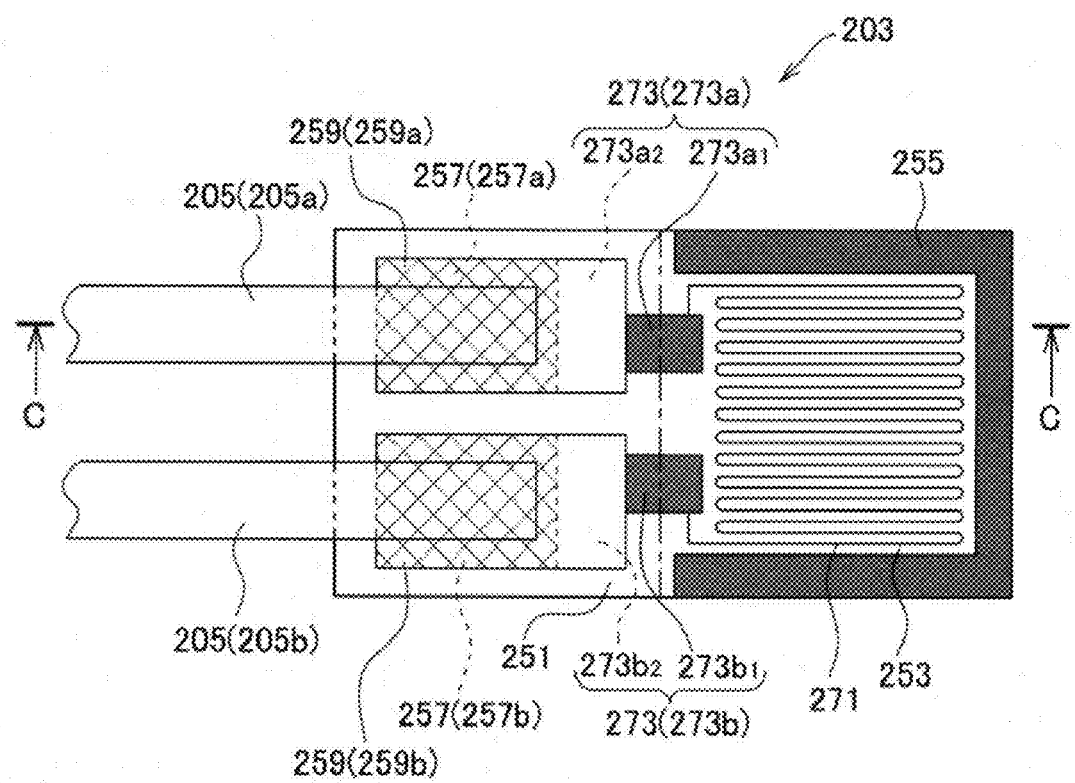
FIG. 8(b) is a plan view of a temperature sensitive element of a third embodiment (however, a covering member is removed, and a ceramic covering layer is illustrated as transparent).
Figure 9:
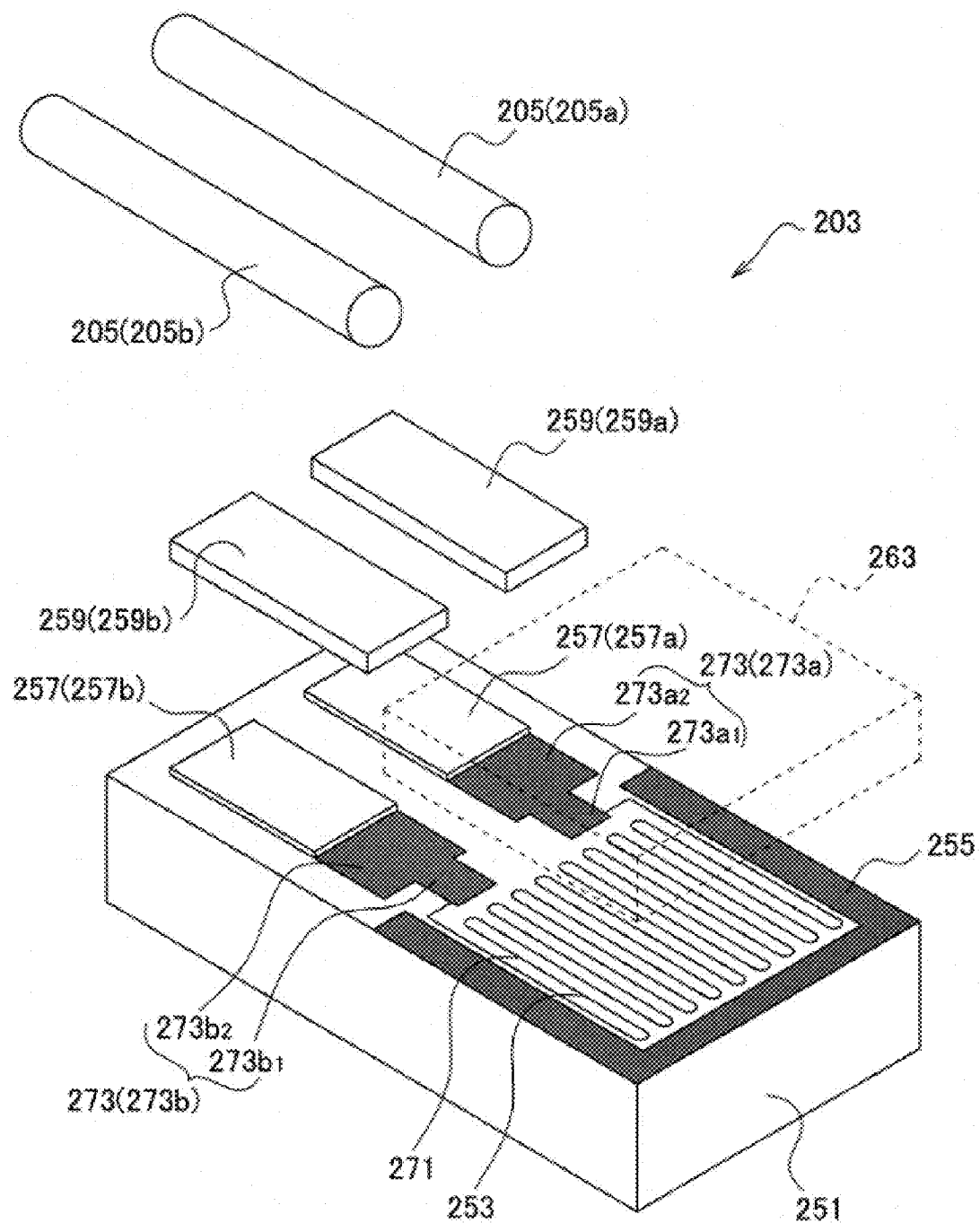
FIG. 9 is an exploded perspective view illustrating the temperature sensitive element of the third embodiment (however, the covering member is removed, and the ceramic covering layer is illustrated as transparent).

As shown in FIGS. 8(a), 8(b), and 9, the temperature sensitive element 203 of the third embodiment has a structure which is substantially the same as the temperature sensitive element of the above-described second embodiment. Specifically, the temperature sensitive element 203 of the third embodiment includes a ceramic substrate 251; a metallic resistor layer 253 formed on one main face (the upper main face in FIG. 8(a)) of the ceramic substrate 251; a volatilization suppressing layer 255 formed on the same main face; a pair of intermediate layers 257a and 257b (collectively referred to as intermediate layers 257) formed on the same main face to be located on the rear end side (on the left side of FIG. 8(a)); a pair of pads 259a and 259b (collectively referred to as pads 259) formed to cover the intermediate layers 257 and cover rear end portions of the metallic resistor layer 253; a pair of output lines 205a and 205b (collectively referred to as output lines 205) joined to the surfaces of the pads 259; a ceramic covering layer 263 covering the upper side (the upper side in FIG. 8(a)) of a forward end portion of the metallic resistor layer 253; and a covering member 265 covering forward end portions of the output lines 205, the pair of pads 259, etc.

In the present third embodiment as well, the metallic resistor layer 253 includes a fine-line portion 271 meandering a plurality of times on the forward end side and a pair of terminal portions 273a and 273b (collectively referred to as terminal portions 273) connected to the opposite ends of the fine-line portion 271. The terminal portions 273 are composed of terminal forward end portions 173a1 and 173b1 and terminal rear end portions 173a2 and 173b2 which have the same shapes as those in the second embodiment.

Particularly, in the present third embodiment, the pair of rectangular intermediate layers 257 (meshed portions in FIG. 8(b)) are formed to extend rearward from the rear ends of the terminal rear end portions 173a2 and 173b2 (and have the same width as the terminal rear end portions 173a2 and 173b2). Notably, the intermediate layers 257 are thick films which are thicker than the metallic resistor layer 253 and have a thickness of, for example, 1 to 30 μm.

Although the intermediate layers 257 are formed of Pt and a glass (of the same type as the glass of the pads 259) like the pads 259, the intermediate layers 257 differ from the pads 259 in the proportion (of contents) of Pt and glass.

Specifically, the proportion of Pt in the pads 259 is set to be larger than the proportion of Pt in the intermediate layers 257. Specifically, whereas the Pt/glass proportion of the pads 259 is, for example, 60/40 vol %, the Pt/glass proportion of the intermediate layers 257 is, for example, 50/50 vol %.

b) Next, a method of manufacturing the temperature sensitive element of the present third embodiment will be described.

Notably, since the method of manufacturing the temperature sensitive element of the present third embodiment is basically the same as the method employed in the first embodiment, the manufacturing method will be described simply.

Figure 10:
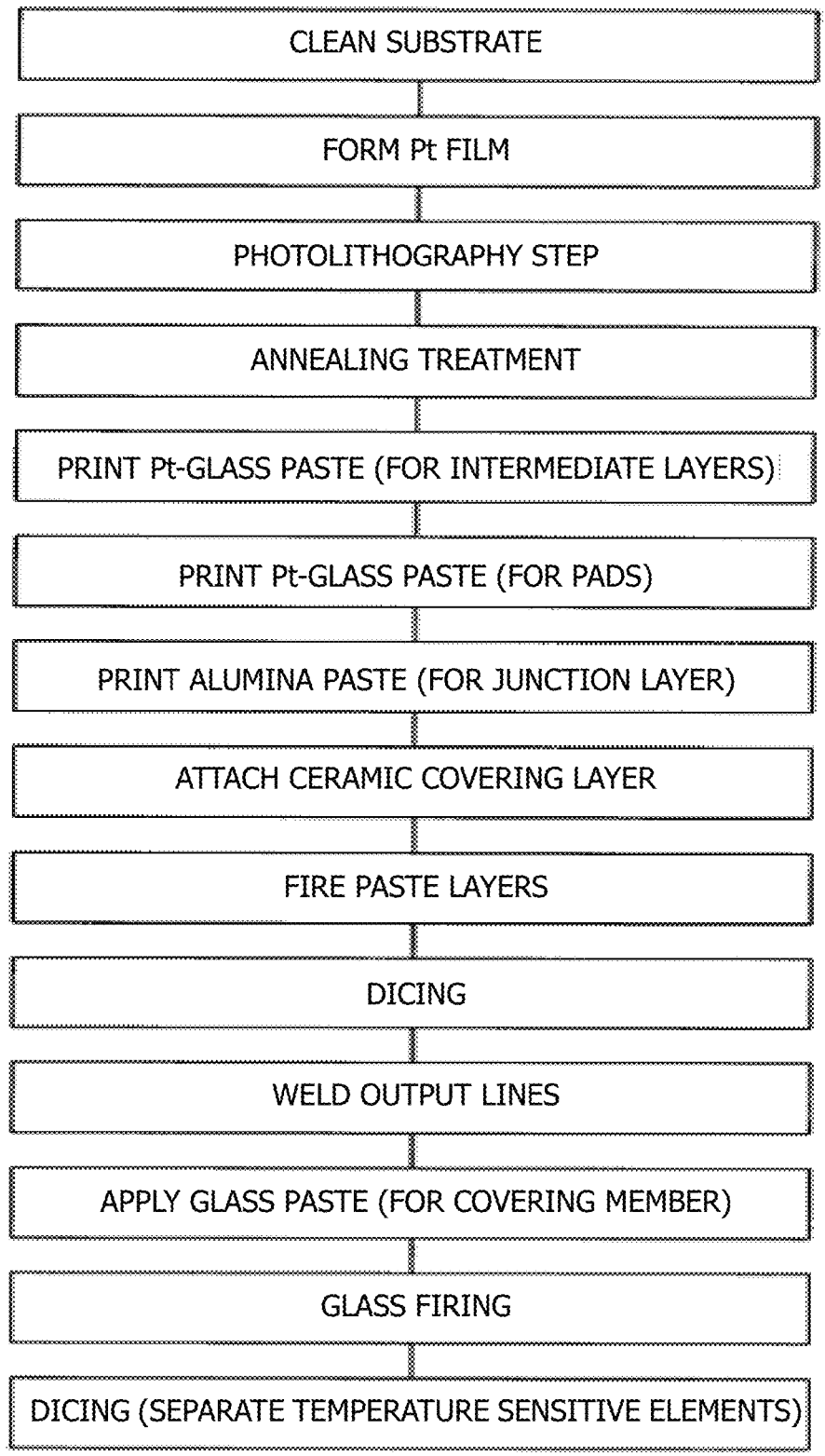
FIG. 10 is an explanatory chart showing a process of manufacturing the temperature sensitive element of the third embodiment step-by-step.

As shown in FIG. 10, in the present third embodiment, cleaning of a substrate, formation of a Pt film, a photolithograph process, and annealing treatment are performed as in the first embodiment.

Next, in order to form the intermediate layers 257, a Pt-glass paste having a composition corresponding to that of the intermediate layers 257 is made. Specifically, the Pt-glass paste for the intermediate layers is made through use of a material prepared by adding 10 parts by mass of a cellulosic resin to 100 parts by mass of a mixture of 85 parts by mass of Pt and 15 parts by mass of a glass.

The Pt-glass paste for the intermediate layers is then applied, by means of printing, to regions where the intermediate layers 275 are to be formed.

Next, in order to form the pads 259, a Pt-glass paste having a composition corresponding to that of the pads 259 is made. Specifically, the Pt-glass paste for pad layers is made through use of a material prepared by adding 10 parts by mass of a cellulosic resin to 100 parts by mass of a mixture of 93 parts by mass of Pt and 7 parts by mass of a glass.

The Pt-glass paste for the intermediate layers is then applied, by means of printing, to regions where the pads 279 are to be formed.

After that, application of alumina paste through printing (for joint layers), attachment of the ceramic covering layer 263, firing of paste layers, dicing (into a work size), welding of output lines 205, application of glass pate (for the covering member 265), firing of glass (of the covering member 265), and dicing for separating temperature sensitive elements 203 from each other are performed in the same manner as in the above-described first embodiment, whereby the temperature sensitive elements 203 are manufactured.

c) The temperature sensor of the present third embodiment achieves the same effects as those achieved by the above-described temperature sensor of the first embodiment. In addition, since the intermediate layers 257 formed of Pt and a glass are provided between the ceramic substrate 251 and the pads 259 formed of Pt and a glass, the temperature sensor of the present third embodiment has an advantage in that the joint strength between the pads 259 and the intermediate layers 257 and the joint strength between the intermediate layers 257 and the ceramic substrate 251 are high.

In addition, since the proportion of Pt in the pads 259 is larger than the proportion of Pt in the intermediate layers 257 (accordingly, the proportion of the glass in the pads 259 is smaller than the proportion of the glass in the intermediate layers 257), a sufficient degree of electrical continuity can be secured at the pads 259, and the pads 259 can be firmly joined to the ceramic substrate 251 through the intermediate layers 257.

Namely, the present third embodiment can achieve a remarkable effect of simultaneously securing a sufficient degree of electrical continuity between the output lines 205 and the metallic resistor layer 253 and securing a sufficiently large fixing force between the pads 259 and the ceramic substrate 251.

Fourth Embodiment

Next, a fourth embodiment will be described; however, description of details similar to those of the above-described first embodiment is omitted.

A temperature sensor of the present fourth embodiment differs from the temperature sensor of the first embodiment in the shape (arrangement) of the metallic resistor layer of the temperature sensitive element.

Figure 11A:
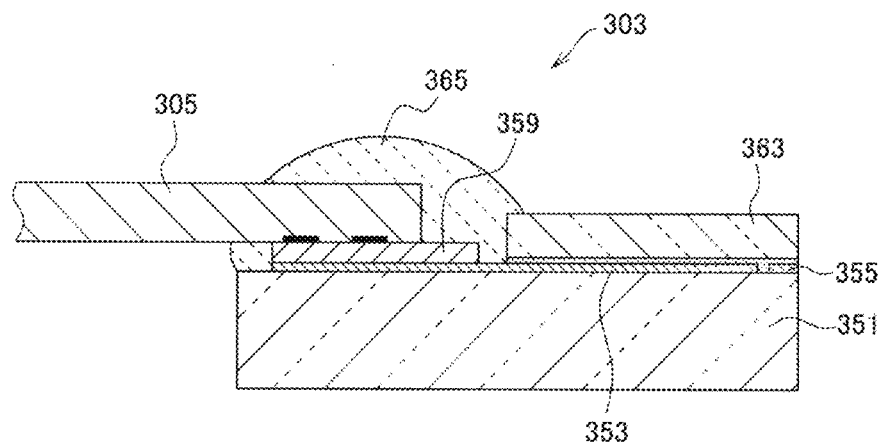
FIG. 11(a) is a cross-sectional view taken along line D-D in FIG. 11(b)
Figure 11B:
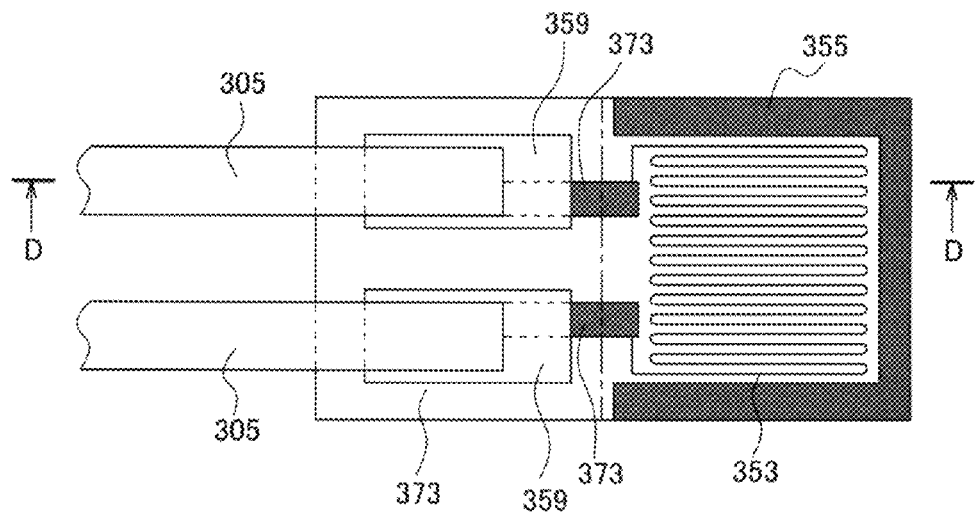
FIG. 11(b) is a plan view of a temperature sensitive element of a fourth embodiment (however, a covering member is removed, and a ceramic covering layer is illustrated as transparent)
Figure 11C:
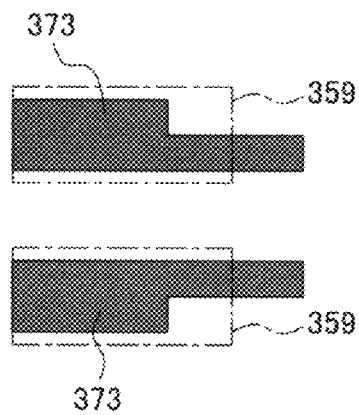
FIG. 11(c) is an explanatory view showing the planar shapes of pads and terminal portions.
Figure 12:
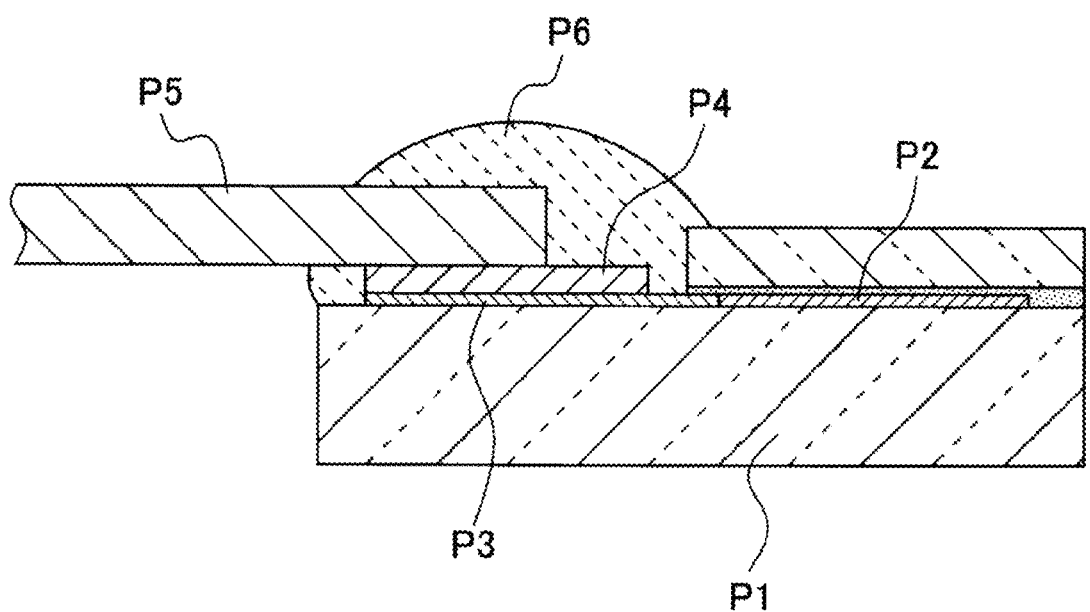
FIG. 12 is an explanatory view showing a conventional technique.

Specifically, as shown in FIG. 11(a) through 11(c), like the temperature sensitive element of the above-described first embodiment, the temperature sensitive element 303 of the fourth embodiment includes a ceramic substrate 351; a metallic resistor layer 353 formed on a main face of the ceramic substrate 351; a volatilization suppressing layer 355 formed on the same main face; a pair of pads 359 formed to cover rear end portions of the pair of terminal portions 373 of the metallic resistor layer 353; a pair of output lines 305 joined to the surfaces of the pads 359; a ceramic covering layer 363 covering the upper side of a forward end portion of the metallic resistor layer 353; and a covering member 365 covering forward end portions of the output lines 305, the pair of pads 359, etc.

In the present fourth embodiment, rear end portions of the two terminal portions 373 of the metallic resistor layer 353 have a width (dimension in the vertical direction of FIG. 11(c)) smaller than that of the pads 359 (in plan view), and extend to regions immediately below the output lines 305.

Accordingly, the pads 359 have portions which are in direct contact with the ceramic substrate 351.

The temperature sensor of the present fourth embodiment achieves the same effects as those achieved by the above-described temperature sensor of the first embodiment. In addition, the temperature sensor of the present fourth embodiment has an advantage in that the adhesion between the pads 359 and the ceramic substrate 351 is high. Namely, since the pads 359 strongly adhere to the ceramic substrate 351, the durability of the temperature sensitive element 303 is high.

First Experimental Example

Next, there will be described a first experimental example performed for confirming the effects of the present invention.

In the present first experimental example, temperature sensitive elements similar to the temperature sensitive element of the above-described first embodiment were manufactured as samples used for an experiment, while the compositional proportions of the pads were changed as shown in Table 1 below, and the fixing force between the output lines and the pads was investigated. Notably, the composition of glass used was $SiO_2$: 52 mass %, CaO: 25 mass %, $Al_2O_3$: 15 mass %, and SrO: 8 mass %, and 10 temperature sensitive elements were manufactured for each type of sample.

A test of investigating the fixing force was performed by a method according to a metal material tensile test (JIS Z2241:2011). In this test, the ceramic substrate side of each temperature sensitive element (sample) was fixed, and the output lines were pulled. The fixing force was investigated on the basis of the state of the output lines; i.e., whether or not the output lines broke or came off (separated from the pads). The results of the test were shown in Table 1. Notably, when the output lines were pulled, a load of 150 MPa (required load) or greater was applied until the output lines broke or came off.

In Table 1 below, the thermal expansion coefficient difference shows the difference (thermal expansion coefficient difference) between the thermal expansion coefficient of the output lines formed of Pt and the thermal expansion coefficient of the Pt-glass material of the pads of Table 1 (20° C.-300° C.)

Notably, the fixing force judgment criteria of Table 1 are as follows. "AA" shows that, in all the ten temperature sensitive elements, the output lines broke without coming off even when the applied load became equal to or greater than the required load. "A" shows that, in all the ten temperature sensitive elements, the output lines came off when the applied load became equal to or greater than the required load. "X" shows that, in all the ten temperature sensitive elements, the output lines came off, and in some temperature sensitive elements, the output lines came off before the applied load reached the required load.

TABLE 1

| | Pad component (vol %) | | Thermal expansion coefficient difference (20-300° C.) | Fixing |
|---|---|---|---|---|
| No. | Pt | Glass | ($\times 10^{-6}$/° C.) | force |
| 1 | 100 | 0 | 0.0 | X |
| 2 | 95 | 5 | 0.2 | A |
| 3 | 90 | 10 | 0.4 | AA |
| 4 | 70 | 30 | 1.5 | AA |
| 5 | 60 | 40 | 2.0 | AA |
| 6 | 50 | 50 | 2.5 | AA |
| 7 | 35 | 65 | 3.3 | A |
| 8 | 25 | 75 | 3.8 | A |
| 9 | 20 | 80 | 4.0 | A |
| 10 | 5 | 95 | 4.8 | X |
| 11 | 0 | 100 | 5.0 | X |

Table 1 shows that the fixing strength is high when the thermal expansion coefficient difference falls within the range of $0.2 \times 10^{-6}$/° C. to $4.0 \times 10^{-6}$/° C., and the fixing strength becomes higher when the thermal expansion coefficient difference falls within the range of $0.4 \times 10^{-6}$/° C. to $2.5 \times 10^{-6}$/° C. Therefore, it is preferred that the thermal expansion coefficient difference fall within the range of $0.4 \times 10^{-6}$/° C. to $2.5 \times 10^{-6}$/° C.

Second Experimental Example

Next, a second experimental example performed for confirming the effect of the present invention will be described.

In the second experimental example, the relation between migration and the alkali metal amount (content) of the glass of the pads was investigated.

Specifically, samples of a temperature sensor including a temperature sensitive element similar to the temperature sensitive element of the above-described first embodiment were manufactured in such a manner that the pads had have the same compositions as the pads in the above-described first embodiment (60 vol % of Pt and 40 vol % of a glass), and the compositional proportions of the glass were changed as shown in Table 2 below.

The temperature sensor of each sample was used at 900° C. for 100 hours, the temperature of an atmosphere having a known temperature (e.g., 600° C.) was measured using the temperature sensor, and its measurement error was investigated. The results of the test are shown in Table 2 below.

Notably, in Table 2, $R_2O$ represents $Na_2O$ and $K_2O$ which are alkali metal oxides. "AA" shows that the measurement error is 0.5° C. or less; "A" shows that the measurement error is greater than 0.5° C. but not greater than 1° C.; and "X" shows that the measurement error is greater than 1° C.

TABLE 2

| | Glass component (mass %) | | | | | Measurement | Insulation |
|---|---|---|---|---|---|---|---|
| No. | $SiO_2$ | CaO | MgO | $Al_2O_3$ | $R_2O$ | error | performance |
| 12 | 57.0 | 16.0 | 6.0 | 21.0 | 0.0 | 0° C. | AA |
| 13 | 56.9 | 16.0 | 6.0 | 21.0 | 0.1 | 0.5° C. | AA |
| 14 | 56.8 | 16.0 | 6.0 | 21.0 | 0.2 | 1.0° C. | A |
| 15 | 56.7 | 16.0 | 6.0 | 21.0 | 0.3 | 2.0° C. | X |

When the electrical insulation performance (accordingly, electrical conductivity) changes due to the influence of migration, the measurement error of the temperature sensor increases. Therefore, Table 2 shows that the resistance to migration is high when the alkali metal content (as reduced to oxide) of the glass of pads is equal to or less than 0.2 mass %.

Notably, the invention is not limited to the above-described embodiment, and needless to say, the present invention can be implemented in various forms without departing from the spirit of the invention.

(1) For example, the temperature sensor including the temperature sensitive element may have any of various known structures.

(2) Also, within the scope of the present invention, various known materials may be used as the materials of the components (e.g., the ceramic substrate, the metallic resistor layer, the output lines, the covering member, etc.) constituting the temperature sensitive element.

DESCRIPTION OF REFERENCE NUMERALS

1: temperature sensor
3, 103, 203, 303: temperature sensitive element
5a, 5b, 5, 105a, 105b, 105, 205a, 205b, 205, 305: output line
51, 151, 251, 351: ceramic substrate
53, 153, 253, 353: metallic resistor layer
257a, 257b, 257: intermediate layer
59a, 59b, 59, 159a, 159b, 159, 259a, 259b, 259, 359: pad
63, 163, 263, 359: ceramic covering layer
65, 165, 265, 365: covering member
73a, 73b, 73, 173a, 173b, 173, 273a, 273b, 273, 373: terminal portion

What is claimed is:

1. A temperature sensitive element comprising:
a ceramic base;
a metallic resistor layer formed on the ceramic base;
a pad formed on the ceramic base, the pad having electric conductivity and being electrically connected to the metallic resistor layer;
an output line formed of a metal and joined to a surface of the pad; and
a covering member disposed on the pad so as to cover at least a portion of the output line, which portion is located on the pad, the covering member containing a glass as a main component and having a thermal expansion coefficient smaller than that of the output line,
wherein the pad is formed of a glass-based material which contains, as main components, a metal and a glass, the glass of the pad having a thermal expansion coefficient smaller than that of the ceramic base, and the pad having a thermal expansion coefficient smaller than that of the output line.

2. A temperature sensitive element according to claim 1, wherein the pad has a portion in direct contact with the ceramic base.

3. A temperature sensitive element according to claim 1, wherein the pad contains the glass in an amount of 5 vol % to 80 vol % with respect to the total amount of the metal and the glass.

4. A temperature sensitive element according to claim 3, wherein the pad contains the glass in an amount of 10 vol % to 50 vol % with respect to the total amount of the metal and the glass.

5. A temperature sensitive element according to claim 1, wherein a difference in thermal expansion coefficient between the output line and the pad is $0.2 \times 10^{-6}/°$ C. to $4.0 \times 10^{-6}/°$ C.

6. A temperature sensitive element according to claim 5, wherein the difference in thermal expansion coefficient between the output line and the pad is $0.4 \times 10^{-6}/°$ C. to $2.5 \times 10^{-6}/°$ C.

7. A temperature sensitive element according to claim 1, wherein the glass of the pad has a softening point of 900° C. or higher.

8. A temperature sensitive element according to claim 1, wherein the glass of the pad has an alkali metal content of 0.2 mass % or less.

9. A temperature sensitive element according to claim 1, wherein an intermediate layer containing a metal and a glass is provided between at least a portion of the pad and the ceramic base, and a proportion of the metal in the pad is greater than a proportion of the metal in the intermediate layer.

10. A temperature sensitive element according to claim 2, wherein the glass of the covering member is the same as the glass of the pad.

11. A temperature sensor comprising a temperature sensitive element according to claim 1.

* * * * *